United States Patent [19]
Yellin et al.

[11] Patent Number: 5,761,513
[45] Date of Patent: Jun. 2, 1998

[54] SYSTEM AND METHOD FOR EXCEPTION HANDLING IN DYNAMICALLY LINKED PROGRAMS

[75] Inventors: Frank Yellin, Redwood City, Calif.; William N. Joy, Aspen, Colo.; Arthur A. Van Hoff, Mountain View, Calif.

[73] Assignee: Sun Microsystems, Inc., Mountain View, Calif.

[21] Appl. No.: 671,304

[22] Filed: Jul. 1, 1996

[51] Int. Cl.$^6$ .................................................. G06F 9/45
[52] U.S. Cl. ........................................ 395/705; 395/704
[58] Field of Search ............................... 395/704, 705, 395/707, 685, 591

[56] References Cited

U.S. PATENT DOCUMENTS

| | | | |
|---|---|---|---|
| 5,347,632 | 9/1994 | Filepp et al. | 395/200 |
| 5,628,016 | 5/1997 | Kukol | 395/704 |

OTHER PUBLICATIONS

"Exception Handling in C++ Without Language Extension", Wong R.S.K. et al., Proc. of TENCON '93, pp. 411–414.

"Improving Exception Handling with Object-Oriented Programming", Dony G., COMPSAC Proceedings, 1990, pp. 36–42.

"Data-Oriented Exception Handling in Ada", Qian Cui et al., IEEE 1990, pp. 98–106.

Ken Thompson, "Regular Expression Search Algorithm," *Communications of the ACM*, Jun. 1968, vol. 11, No. 6, pp. 419–422.

Kin-Man Chung and Herbert Yuen, "A 'Tiny' Pascal Compiler; Part 1: The P-Code Interpreter," *BYTE Publications, Inc.*, Sep. 1978.

Kin-Man Chung and Herbert Yuen, "A 'Tiny' Pascal Compiler; Part 2: The P-Compiler," *BYTE Publications, Inc.*, Oct. 1978.

Gene McDaniel, "An Analysis of a Mesa Instruction Set," *Association for Computing Machinery*, May 1982.

Kenneth A. Pier, "A Retrospective on the Dorado, A High-Performance Personal Computer," *IEEE Computer Society, 10th Annual Intl. Symposium on Computer Architecture*, 1983, pp. 252–269.

James G. Mitchell, et al., "Mesa Language Manual," *Xerox Corporation, Palo Alto Research Center*.

*Primary Examiner*—Emanuel T. Voeltz
*Assistant Examiner*—Kakali Chaki
*Attorney, Agent, or Firm*—Gary S. Williams; Flehr Hohbach Test Albritton & Herbert LLP

[57] ABSTRACT

A compiler requires normal exceptions that are throwable by a method to be either explicitly declared or else "caught" by appropriate exception handlers in the method to be compiled. This ensures that all normal exceptions thrown will be handled by a programmer specified exception handler. The compiler inspects all instructions in a specified method that throw exceptions and all instructions that invoke other methods, and determines whether each type of exception throwable by those instructions and invocable methods is (A) a serious exception (i.e., not a normal exception), (B) is caught by an enclosing exception handler, or (C) is explicitly declared in the method header of the specified method. If any throwable exception cannot be so categorized, that means the throwable exception is a normal exception that is not caught by an enclosing exception and is not explicitly declared in the method header, which means that the method to be compiled is not well formed. As a result, the compiler rejects the specified method, aborting compilation and generating an appropriate error message. The compiler determines the set of throwable exceptions in part by inspecting the methods that are invocable by the specified method for declarations of throwable exceptions. When initiating execution of the specified method, the program execution system inspects the method's declaration of throwable exceptions and blocks execution of the specified method unless exception handlers have been established for handling all the exceptions, if any, included in the declaration.

15 Claims, 7 Drawing Sheets

| FIG. 3A | FIG. 3B |

SYSTEM AND METHOD FOR EXCEPTION HANDLING IN DYNAMICALLY LINKED PROGRAMS

The present invention relates generally to compilation and execution of object oriented computer software, and more specifically to a program compiler and a program pre-execution verifier that together ensure that one or more exception handlers have been established for handling certain classes of exceptions that can be thrown during execution of a compiled method.

BACKGROUND OF THE INVENTION

Referring to FIG. 1, in the context of computer programs (usually called methods) using the Java programming language (Java is a trademark of Sun Microsystems, Inc.), an exception handler 100 is a procedure (or a set of instructions within a procedure) that protects a specified set of program code, called a protected code block 102. The exception handler is executed whenever the applicable exception gets thrown during execution of the corresponding protected code. For instance, a particular exception handler, such as a procedure for handling "end of file" I/O errors, may be defined to be applicable to a particular portion of a first method 104 (Method C.1). If the corresponding exception (i.e., an end-of-file exception in this example) is thrown during execution of the protected code 102, execution of the exception handler 100 is initiated.

A thrown exception is said to be "caught" (i.e., handled) by an exception handler if there is an applicable "enclosing exception handler" for the thrown exception. An "enclosing exception handler" is one whose scope or range of applicable instructions includes the instruction that throws a corresponding exception. From the perspective of a particular instruction in a method, the set of enclosing exception handlers is the set of exception handlers whose range of applicable instructions includes the particular instruction.

If the protected portion of the first method includes subroutine calls (called "invoke" instructions in the Java bytecode language) to other methods 106, which in turn may include nested calls to a set of further methods 108, 110, then end-of-file errors generated by any of the methods 106, 108, 110 called directly or indirectly by the protected code 102 also will cause execution of the aforementioned exception handler to be invoked. However, if a nested method 112 includes its own end-of-file exception handler 114, that version of the end-of-file exception handler will be used to handle end-of-file exceptions caused by execution of that one nested method, as well as end-of-file exceptions caused by execution of any methods 116 called by that one nested method.

Exception handlers can themselves have exception handlers.

In most programming languages used prior to the development of the Java programming language, programmers are not required to explicitly declare all exceptions that can be thrown by the programs they have written, in part because such declarations would be very lengthy and in many cases not particularly useful. While some languages, such as Modula-3 and C++, allow programmers to declare exceptions that can be thrown by their programs, they do not provide a practical and complete solution for ensuring that exception handlers are established for handling at least all "normal" exceptions that can be reasonably addressed by application-level programs.

SUMMARY OF THE INVENTION

The present invention, embodied typically in a program compiler and/or in a program interpreter, in used in a system in which exceptions are divided into at least two groups: normal exceptions that are raised explicitly by executing methods, and more serious exceptions that arise from virtual machine failures and runtime errors, such as security exceptions, stack underflow or overflow, illegal arguments in procedure calls, and so on. Exceptions are organized in a class hierarchy so that exception handlers for higher classes of exceptions can be used to handle corresponding subclasses of exceptions.

The compiler of the present invention requires all normal exceptions that are throwable by a method to be either explicitly declared or else "caught" by appropriate exception handlers in the method to be compiled.

More specifically, the compiler inspects all instructions (in a specified method) that throw exceptions and all instructions that invoke other methods, and determines whether each type of exception throwable by those instructions and invocable methods is (A) a serious exception (i.e., not a normal exception), (B) is caught by an enclosing exception handler, or (C) is explicitly declared in the method header of the specified method. If any throwable exception cannot be so categorized, that means the throwable exception is a normal exception that is not caught by an enclosing exception and is not explicitly declared in the method header, which means that the method to be compiled is not well formed. As a result, the compiler rejects the specified method, aborting compilation and generating an appropriate error message.

The compiler determines the set of throwable exceptions in part by inspecting the methods that are invocable by the specified method for declarations of throwable exceptions.

In one embodiment, when initiating execution of any specified method, the system of the present invention inspects the declaration of throwable exceptions in the specified method and blocks execution of the specified method unless exception handlers have been established for handling all the exceptions, if any, included in the declaration.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

In the preferred embodiment, the code for each method includes the following information:

the maximum stack space needed by the method;

the maximum number of registers used by the method;

the actual bytecodes for executing the method;

a table of exception handlers.

Each entry in the exception handlers table gives a start and end offset into the bytecodes, an exception type, and the offset of a handler for the exception. The entry indicates that if an exception of the indicated type occurs within the code indicated by the starting and ending offsets, a handler for the exception will be found at the given handler offset.

In the preferred embodiment, all the methods associated with an object class are stored together in a data structure called a class file. Each method has its own exception table and furthermore the code of each method includes the code for the exception handlers referenced by its exception table. For the purposes of this invention it makes no difference whether there is a separate table of exception handlers for each method, or just one for all the methods in a class.

Another preliminary point that should be understood is that the methods in a Java class file 230 (see FIG. 4) are generally "programs" (i.e., methods) that were written in the Java source code language, and then were compiled by a Java compiler 226 (see FIG. 4) into the Java bytecode language. The compiler includes the procedures for building a class file that holds all the compiled methods of the associated class. The Java "compiler" does not generate machine dependent code, sometimes known as object code or relocatable object code. Rather, the output of the Java compiler is a Java bytecode language method that is platform independent. Thus, Java bytecode language methods (usually called Java programs or Java methods) can be executed on any computer that has a Java virtual machine.

Figure 1:
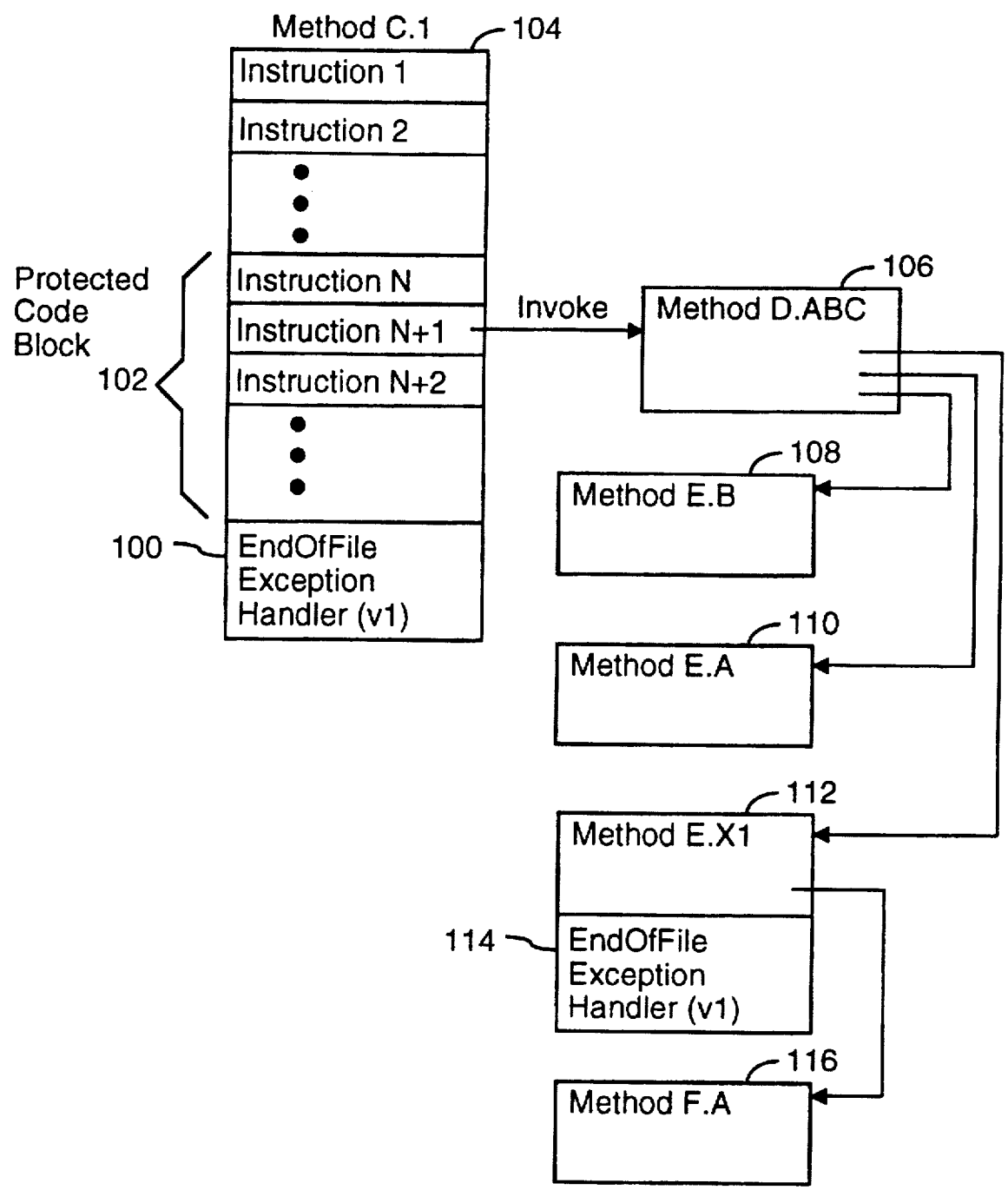
FIG. 1 is a block diagram of a set of methods that are linked to each other at runtime by procedure calls.
Figure 2:
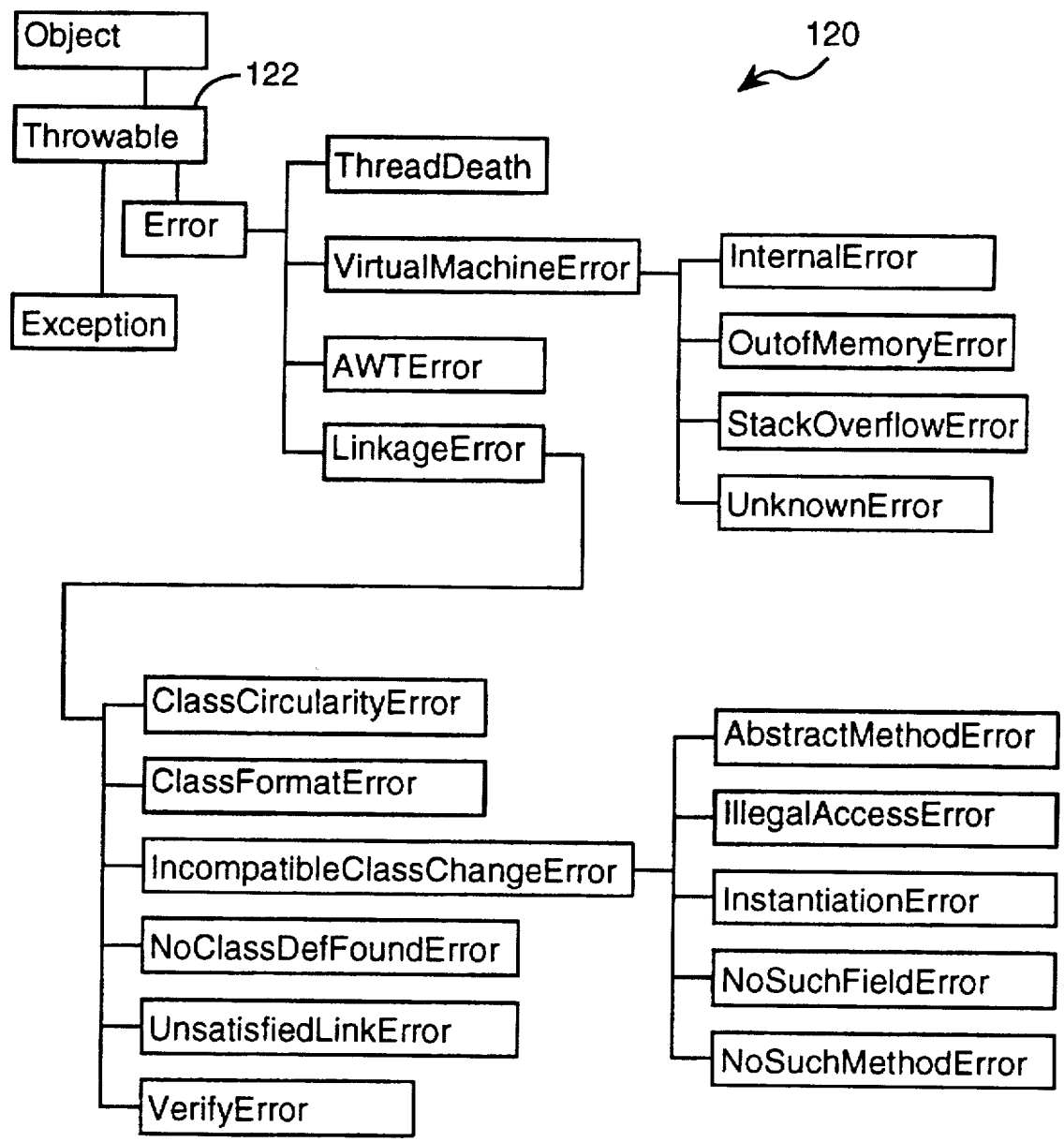
FIG. 2 is a block diagram of a first portion of the exception class hierarchy in a preferred embodiment of the present invention.
Figure 3A:
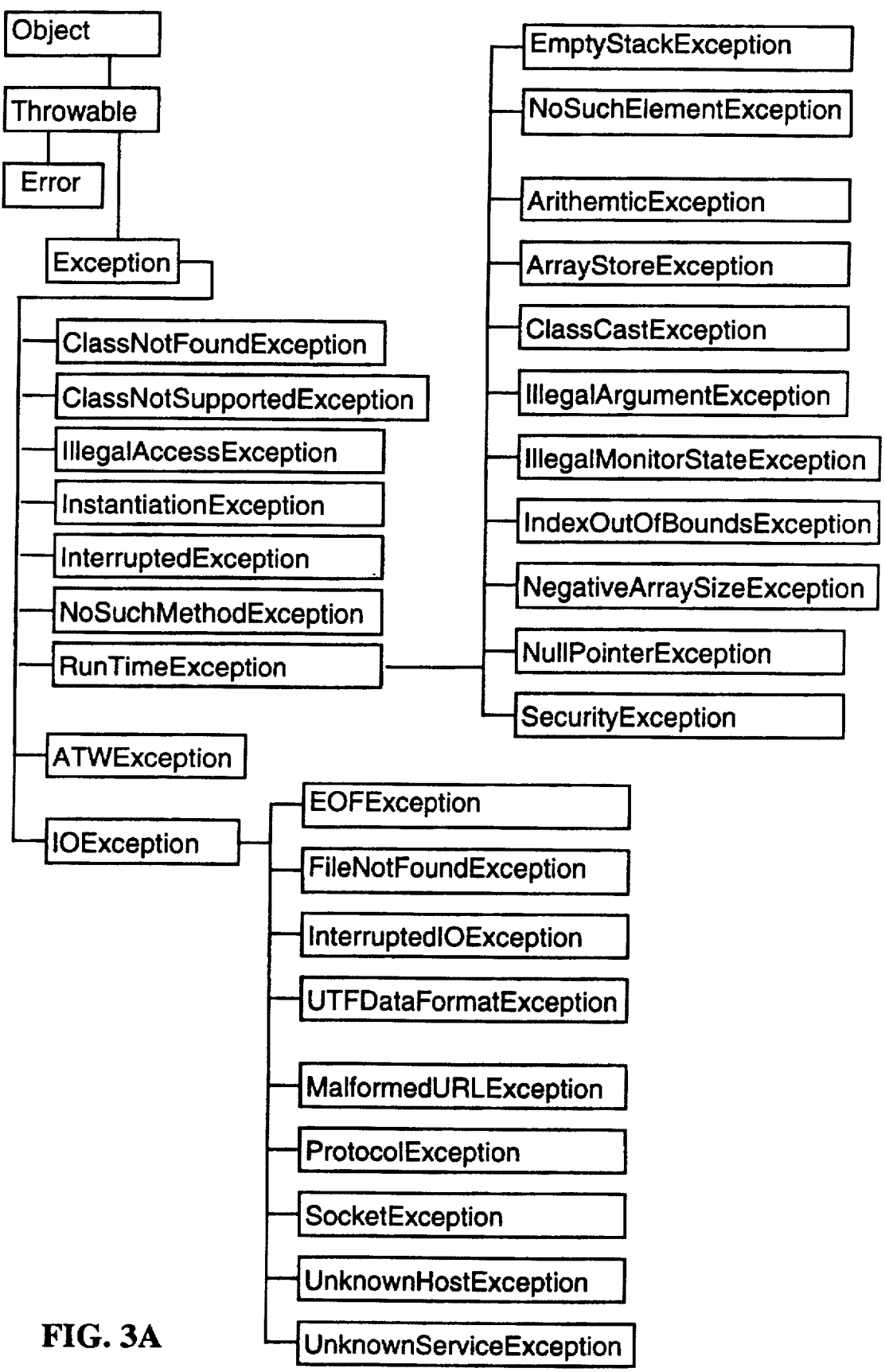
FIGS. 3A and 3B, collectively shown as FIG. 3 is a block diagram of a second portion of the exception class hierarchy in a preferred embodiment of the present invention.
Figures 3, 3B:
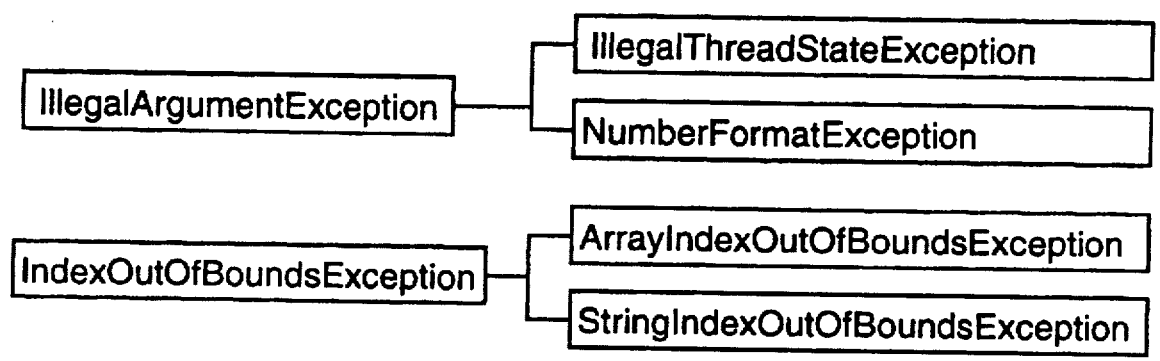

In the preferred embodiment, exceptions are organized in a class hierarchy 120. Referring to FIGS. 2 and 3, in a preferred embodiment the exception class hierarchy has a highest exception class called "Throwable" 122 and two main branches: a set of extraordinarily serious exceptions whose superclass is the "Error" class and a set of somewhat less catastrophic exceptions whose superclass is the "Exception" class.

When an exception is thrown, the Java virtual machine executes the first exception handler found in a tree search of the enclosing exception handlers that is applicable to the thrown exception. To ensure that the lowest class enclosing exception handler applicable to the thrown exception is used, the authors of Java programs (i.e., methods) will generally order the exception handlers within each method so that the lower class exception handlers are positioned before the higher class exception handlers (where class rank is determined by position of the exception hierarchy shown in FIGS. 2 and 3). Further, when there are two or more enclosing exception handlers for exactly the same exception condition that are applicable to an instruction that causes a that exception to be thrown, the Java virtual machine executes the applicable enclosing exception handler established by the method closest in the chain of method calls to the method causing the thrown exception.

For instance, consider a first method for which there are only two established exception handlers (e.g., only two exception handlers are noted in the method's exception table), one for end of file exceptions (EOFException) followed by one for I/O exceptions (IOException), that are applicable to the same protected code block. If an EOF (end of file) exception is thrown by the Java virtual machine while executing the protected code block, the EOFException handler is executed. If any other subclass of the IOException class is thrown by the Java virtual machine while executing the protected code block, such as an InterruptedIOException, then the IOException handler is executed. Furthermore, if a second method that called the first method also has an established end of file exception handler, the EOFException handler for the first method would be used to handle end of file exceptions thrown by the first method because locally established exception handlers take precedence over more remotely established exception handlers.

For the most part, exceptions that are subclasses of the Error class and exceptions that are subclasses of the RuntimeException class are thrown by the Java virtual machine, while all other exceptions that are subclasses of the Exception class are throwable by Java methods. These "other" exceptions are so-called "normal" exceptions such as:

end of file;

file not found;

interrupted input/output; and network communication errors.

Other "normal" exceptions that are typically thrown by the Java virtual machine (i.e., the Java bytecode interpreter) when executing Java methods are:

class not found (i.e., the system was unable to find the applicable class file);

class not supported;

illegal access object instantiation error interrupted method execution; and failure to find a called method (NoSuchMethodException);

While the normal exceptions are usually explicitly thrown by "throw" instructions in Java methods during execution by the Java virtual machine, these exceptions can also be thrown by native methods (i.e., programs written in the object code for the underlying computer hardware) that are invoked by Java methods.

For the purposes of this document, the term "normal exceptions" shall mean all types of exceptions for which the authors of application programs must provide exception handlers, and the term "non-manageable exceptions" shall mean all types of exceptions other than normal exceptions.

Figure 4:
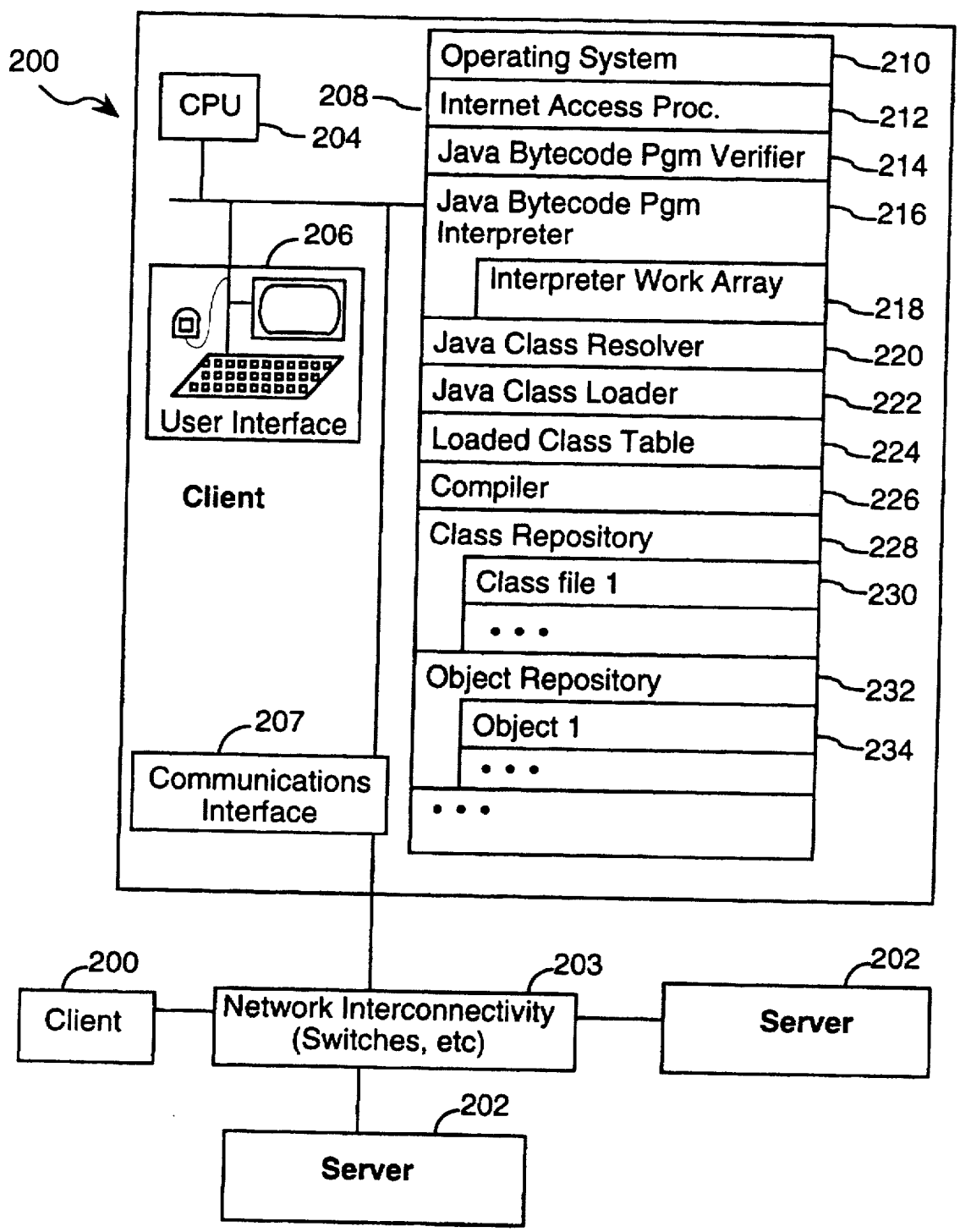
FIG. 4 is a block diagram of a computer workstation incorporating a Java virtual machine and a Java program compiler in accordance with a preferred embodiment of the present invention.

Referring to FIG. 4, a workstation or other computer 200 implementing the preferred embodiment of the present invention will typically be a client computer in a computer network that includes other client computers 200 as well as one or more servers 202, all interconnected via one or more communications media 203.

More specifically, computer workstation 200 includes a central processing unit 204, a user interface 206, a communications interface 207 such as an Internet communications port, and memory 208.

Memory 208 stores:

an operating system 210;

an Internet communications manager program 212, such as the HotJava (a trademark of Sun Microsystems, Inc.) Web browser program;

a Java bytecode program verifier 214 for verifying whether or not a specified program (i.e., method) satisfies certain predefined integrity criteria;

a Java bytecode program interpreter 216 for executing Java bytecode programs loaded into an interpreter work array 218;

Java class resolver 220, which dynamically links methods during execution of those methods, including determining if an invoked method is already loaded and calling the class loader 222 if the invoked method is not already loaded;

a Java class loader 222, which loads object classes into a user's address space and utilizes the bytecode program verifier to verify the integrity of the methods associated with each loaded object class;

a Java class table 224, which references all loaded object classes;

a compiler 226 for compiling Java source code programs into Java bytecode programs;

at least one class repository 228, for locally storing object classes (i.e., class files) 230 in use and/or available for use by user's of the computer 200;

at least one object repository 232 for storing objects 234, which are instances of objects of the object classes stored in the object repository 228.

In the preferred embodiment the operating system 210 is an object-oriented multitasking operating system that supports multiple threads of execution within each defined address space. In the preferred embodiment, the client system 202 is a Sun Microsystems SPARC Workstation using a SPARC microprocessor and the Solaris operating system. However, the present invention is equally applicable to computer systems using other hardware and operating system platforms.

The "Java virtual machine" includes the aforementioned bytecode program verifier 214, interpreter 216, class resolver 220, class loader 222 and loaded class table 224.

Exception Handling Features of Method Compiler

In the preferred embodiment, each method that throws any normal exceptions, or which calls any methods that throw any normal exceptions must, for each such type of normal throwable exception either (A) provide, within the method an exception handler that "catches" (i.e., processes or handles) the exception or one of its superclasses, or (B) explicitly declare the method to throw the exception or one of its superclasses. To make this more concrete, consider a method whose code contains the statement:

throw AbcException where AbcException is not a subclass of either Error or RunTimeException. This method must either (A) include an AbcException handler whose specified range of applicable instructions includes the aforementioned statement, or (B) include a declaration in its header that the method throws exceptions of type AbcException.

Thus, before any source method is compiled into a compiled method such as a Java bytecode method or applet, the author of the method must include in the method a header that includes a declaration of all normal exception types throwable by the method for which an enclosing exception handler is not provided. That is, the throwable exception types declared in the source method's header (as well as in the compiled method) must include all normal exception types that are throwable by the present method and the methods it calls, excluding those exception types for which enclosing applicable exception handlers are provided by the present method or by the methods called by the present method.

Figure 5:
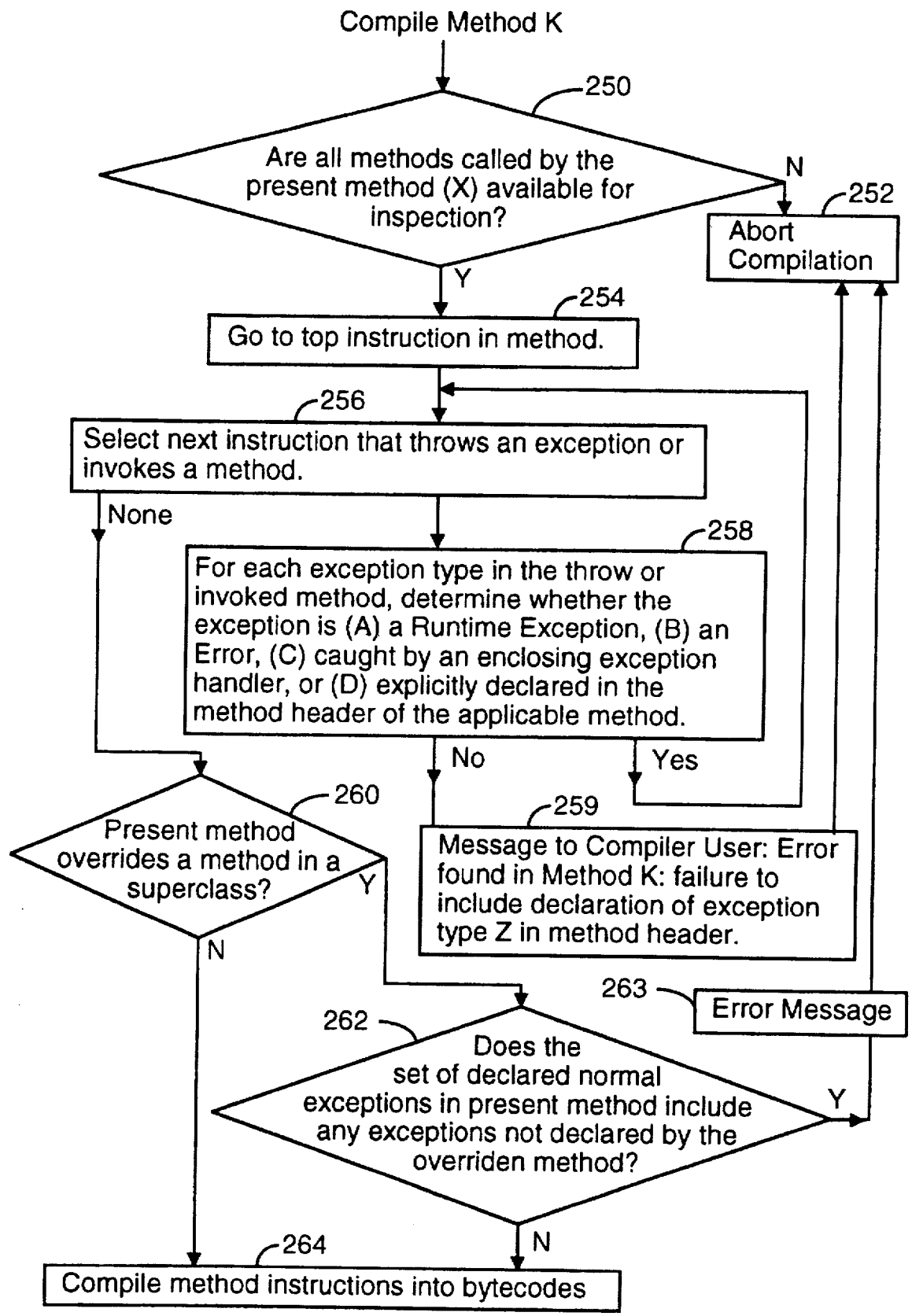
FIG. 5 is a flow chart of the operation of a method compiler in accordance with a preferred embodiment of the present invention.

Referring to FIG. 5., the "policy" of requiring all normal exceptions to be either explicit handled or explicitly declared within each method is implemented, in part, in the context of Java virtual machines by requiring that all sub-routines (i.e., methods) that may be called by the method to be compiled must be present in the computer system performing the compilation or otherwise available for inspection by the compiler during the compilation process.

More specifically, during the compilation of a method (hereinafter called the present method), the compiler determines whether all methods called or callable by the present method are available for inspection by the compiler (step 250). If not, the compilation is aborted (step 252). Otherwise, the compiler inspects all instructions in a specified method that throw exceptions and all instructions that invoke other methods (step 254, 256), and determines (step 258) whether each type of exception throwable by those instructions and invocable methods is (A) a Runtime exception, (B) an Error, (C) is caught by an enclosing exception handler, or (D) is explicitly declared in the method header of the specified method. If any throwable exception cannot be so categorized, that means the throwable exception is a normal exception that is not caught by an enclosing exception and is not explicitly declared in the method header, which means that the method to be compiled is not well formed. As a result, the compiler rejects the specified method, aborting compilation (252) and generating an appropriate error message (259). If all normal exception types throwable by the specified method are either handled by an enclosing applicable exception handler or are declared in the header of the specified method, one further check (steps 260, 262) is made before the method is compiled (step 264).

In the preferred embodiment, whenever a method is invoked that "overrides" another method in a superclass (i.e., a higher class in the class hierarchy) that has the same name, the overriding method can throw only the same normal exceptions as those throwable by the method being overridden, unless it provides enclosing exception handlers for those additional exception types. This policy is enforced by the compiler, which when compiling any method checks to see if a method of the same name is included in any superclass of the method being compiled, and if so will prevent compilation of the overriding method if it can throw any normal exceptions not throwable by the method being overridden, unless it provides enclosing exception handlers for those additional exception types. In particular, if the present method overrides a method in a superclass of the present method (260), and the set of normal throwable exceptions declared for the present method includes any exceptions not included in the set of declared throwable exceptions of the method being overridden (step 262), then an appropriate error message is generated (step 263) and compilation is aborted (252). If the set of declared exception types in the header of the present method meet all precompilation requirements, then compilation of the present method is enabled (step 264).

Although it has been stated above, it bears repeating that the set of throwable exceptions in a method that must be declared or handled by an exception handler within the scope of that method does not include "non-manageable exceptions". As a result, even if the present method, or a method invoked by the present method, includes an instruction that explicitly throws one of the non-manageable exceptions, the present method does not need to declare that exception as a throwable exception and does not need to provide an exception handler for it. Thus, when the compiler inspects all the throw instructions in the present method for purposes of determining the set of throwable normal exceptions that lack enclosing applicable exception handlers, it excludes from consideration instructions that throw non-manageable exceptions.

Using the methodology of FIG. 5, all compiled methods include explicit declarations of normal exceptions that are throwable directly or indirectly by the compiled methods, excluding those normal exceptions for which enclosing applicable exception handlers have been provided.

It should be noted that some method calls are performed via a mechanism that in Java is called an "interface." An interface will generally include a definition of all methods that can be called via the interface. Thus, the compiler, when compiling a method that invokes a method through an interface, can determine the exceptions throwable by any method callable via the interface by inspecting all the methods defined as being callable via the interface.

Figure 6:
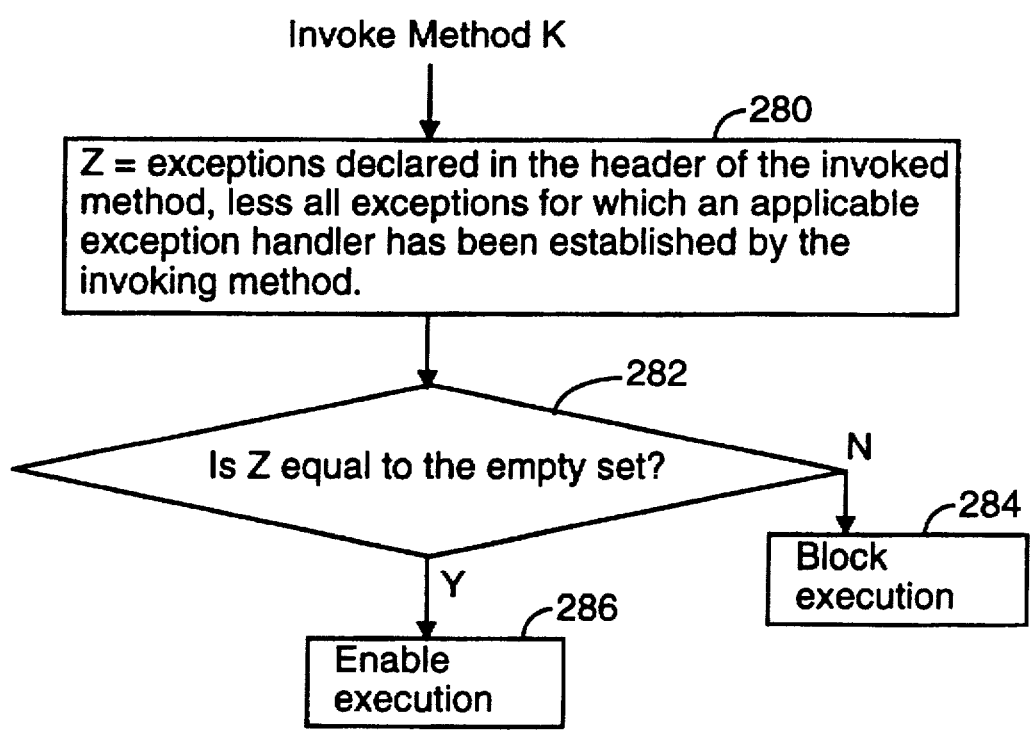
FIG. 6 is a flow chart of the operation of a virtual machine in accordance with a preferred embodiment of the present invention.

Referring to FIG. 6, the interpreter 216 that executes compiled programs (e.g., Java bytecode programs) may also enforce the policy that all normal exceptions that are throwable by an invoked method be handled by exception handlers. Thus, at runtime, it should not be possible for a method to throw a normal exception that is not handled by an applicable exception handler.

More specifically, in one embodiment of the present invention, whenever a method is invoked, the list of normal exceptions that are declared by the called method are compared with the set of enclosing exception handlers that are applicable to called method as a whole (step 280). An exception handler may be applicable to all the instructions in a method because it is applicable to the instruction that called the method. If the method being executed is the main program being executed and thus was not called by any other program, the method's header must not include any declarations of normal exceptions as being throwable, because that would mean that there is no established exception handler for the declared exceptions.

Also, if a method is invoked via an interface, as opposed to being invoked by a method invocation command, then the method will be in compliancy with the exception handler coverage policy only if the called method has established exception handlers for all normal exceptions declared in the header of the invoked method.

If the invoked method's header declares any normal exceptions for which the invoking (i.e., calling) method had not established applicable exception handlers (step 282), then execution of the invoked method is blocked (step 284). In most events, this will cause the invoking method to abort execution and for a message to be generated by the virtual machine to inform the user as to why execution of the invoking method was halted. If all throwable normal exceptions are covered by applicable exception handlers, execution of the invoked method is enabled (step 286).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is applicable to programs and methods written in programming languages other than Java, including programming languages that are compiled to platform dependent code.

In an alternate embodiment, the compiler portion of the present invention could be implemented as a procedure separate from the compilation procedure, such as a procedure that generates and embeds in an executable program a declaration of throwable exceptions. In this embodiment, the virtual machine or program launcher (for platform dependent programs) responsible for managing execution of programs could be designed to block execution of any program that does not include a declaration of throwable exceptions.

When a program throws no exceptions, the declaration of throwable exceptions would still be embedded but would indicate a null set of throwable exceptions.

What is claimed is:

1. A computer implemented method of managing exceptions throwable by a specified method, said specified method including a declaration of throwable exceptions, said throwable exceptions in said declaration including exceptions throwable during execution of said specified method that may not be handled by enclosing exception handlers, comprising the steps of:

determining a set of exceptions that are (A) throwable by the specified method and by methods that can be invoked by the specified method, (B) not members of a predefined set of excluded exceptions, and (C) not handled by enclosing exception handlers; and comparing said determined set with said throwable exceptions in said declaration to determine whether any of said throwable exceptions in said set are not included declaration; and preventing compilation of said specified method when said comparing step determines that at least one throwable exceptions in said set is not included declaration.

2. The method of claim 1, generating an error message when said comparing step determines that at least one throwable exceptions in said set is not included declaration.

3. The method of claim 1, said determining step including inspecting said methods throwable by the specified method for declarations of throwable exceptions, determining which of said declared throwable exceptions in said inspected methods are handled by enclosing exception handlers, and including in said set those of the throwable exceptions declared in said inspected methods that are not handled by enclosing exception handlers.

4. The method of claim 1, performing said determining, comparing and preventing steps while compiling the specified method from source code into compiled code.

5. The method of claim 1, when initiating execution of the specified method, inspecting said declaration of throwable exceptions in the specified method and blocking execution of the specified method unless exception handlers have been established for handling the exceptions, if any, included in said declaration.

6. A computer program product for use in conjunction with a computer system, the computer program product comprising a computer readable storage medium and a computer program mechanism embedded therein, the computer program mechanism configured to direct the operation of the computer system to manage exceptions throwable by a specified method, said specified method including a declaration of throwable exceptions, said throwable exceptions in said declaration including exceptions throwable during execution of said specified method that may not be handled by enclosing exception handlers, comprising:

a first set of instructions for determining a set of exceptions that are (A) throwable by the specified method and by methods that can be invoked by the specified method, (B) not members of a predefined set of excluded exceptions, and (C) not handled by enclosing exception handlers; and a second set of instructions for comparing said determined set with said throwable exceptions in said declaration to determine whether any of said throwable exceptions in said set are not included declaration; and a third set of instructions for preventing compilation of said specified method when said comparing step determines that at least one throwable exceptions in said set is not included declaration.

7. The computer program product of claim 6, said third set of instructions including instructions for generating an error message when said comparing step determines that at least one throwable exceptions in said set is not included declaration.

8. The computer program product of claim 6, said first set of instructions including instructions for inspecting said methods throwable by the specified method for declarations of throwable exceptions, determining which of said declared throwable exceptions in said inspected methods are handled by enclosing exception handlers, and including in said set those of the throwable exceptions declared in said inspected methods that are not handled by enclosing exception handlers.

9. The computer program product of claim 6, wherein said first, second and third sets of instructions are subsets of a set of instructions for specified methods from source code into compiled code.

10. The computer program product of claim 6, including a fourth set of instructions that, when execution of the specified method is initiated, inspect said declaration of throwable exceptions in the specified method and block execution of the specified method unless exception handlers have been established for handling the exceptions, if any, included in said declaration.

11. In a distributed computer system, a set of computer-readable modules suitable for transmission over communications links to data processing systems, said set of modules comprising:

a first set of instructions for determining a set of exceptions that are (A) throwable by the specified method and by methods that can be invoked by the specified method, (B) not members of a predefined set of excluded exceptions, and (C) not handled by enclosing exception handlers; and a second set of instructions for comparing said determined set with said throwable exceptions in said declaration to determine whether any of said throwable exceptions in said set are not included declaration; and a third set of instructions for preventing compilation of said specified method when said comparing step determines that at least one throwable exceptions in said set is not included declaration.

12. The set of computer readable modules of claim 11, said third set of instructions including instructions for generating an error message when said comparing step determines that at least one throwable exceptions in said set is not included declaration.

13. The set of computer readable modules of claim 11, said first set of instructions including instructions for inspecting said methods throwable by the specified method for declarations of throwable exceptions, determining which of said declared throwable exceptions in said inspected methods are handled by enclosing exception handlers, and including in said set those of the throwable exceptions declared in said inspected methods that are not handled by enclosing exception handlers.

14. The set of computer readable modules of claim 11, wherein said first, second and third sets of instructions are subsets of a set of instructions for specified methods from source code into compiled code.

15. The set of computer readable modules of claim 11, including a fourth set of instructions that, when execution of the specified method is initiated, inspect said declaration of throwable exceptions in the specified method and block execution of the specified method unless exception handlers have been established for handling the exceptions, if any, included in said declaration.

* * * * *

UNITED STATES PATENT AND TRADEMARK OFFICE
CERTIFICATE OF CORRECTION

PATENT NO. : 5,761,513
DATED : June 2, 1998
INVENTOR(S) : Frank Yellin, William N. Joy, and Arthur A. Van Hoff It is certified that error appears in the above-identified patent and that said Letters Patent is hereby corrected as shown below:

Claim 1, line 20, column 8, add "in said" before "declaration"

Claim 1, line 23, column 8, delete "exceptions" and add "exception"

Claim 1, line 23, column 8, add "in said" before "declaration"

Claim 2, line 26, column 8, delete "exceptions" and add "exception"

Claim 2, line 26, column 8, add "in said" before "declaration"

Claim 6, line 64, column 8, add "in said" before "declaration"

Claim 6, line 1, column 9, delete "exceptions" and add "exception"

Claim 6, line 2, column 9, add "in said" before "declaration"

Claim 7, line 6, column 9, delete "exceptions" and add "exception"

UNITED STATES PATENT AND TRADEMARK OFFICE
CERTIFICATE OF CORRECTION

PATENT NO. : 5,761,513
DATED : June 2, 1998
INVENTOR(S) : Frank Yellin, William N. Joy, and Arthur A. Van Hoff It is certified that error appears in the above-identified patent and that said Letters Patent is hereby corrected as shown below:

Claim 7, lines 6 and 7, column 9, add "in said" before "declaration"

Claim 11, line 4, column 10, add "in said" before "declaration"

Claim 11, line 7, column 10, delete "exceptions" and add "exception"

Claim 11, line 8, column 10, add "in said" before "declaration"

Claim 12, line 12, column 10, delete "exceptions" and add "exception"

Claim 12, line 13, column 10, add "in said" before "declaration"

Signed and Sealed this

Twelfth Day of January, 1999

Attest:

*Attesting Officer*    *Acting Commissioner of Patents and Trademarks*